(12) United States Patent
Gorski et al.

(10) Patent No.: US 11,047,465 B2
(45) Date of Patent: Jun. 29, 2021

(54) DRIVELINE COMPONENT HAVING DIFFERENTIAL ASSEMBLY WITH RETAINING MEMBER WELDED TO DIFFERENTIAL CASE TO RETAIN CROSS-PIN

(71) Applicant: AMERICAN AXLE & MANUFACTURING, INC., Detroit, MI (US)

(72) Inventors: Robert C. Gorski, Royal Oak, MI (US); Douglas J. Chemelli, Royal Oak, MI (US); Cory J. Padfield, Royal Oak, MI (US); Toby V. Padfield, Livonia, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 60 days.

(21) Appl. No.: 16/432,068

(22) Filed: Jun. 5, 2019

(65) Prior Publication Data

US 2019/0285156 A1 Sep. 19, 2019

Related U.S. Application Data

(62) Division of application No. 15/432,162, filed on Feb. 14, 2017, now Pat. No. 10,352,425.

(51) Int. Cl.
*F16H 48/40* (2012.01)
*F16H 48/08* (2006.01)
*F16H 48/38* (2012.01)

(52) U.S. Cl.
CPC ............. *F16H 48/40* (2013.01); *F16H 48/08* (2013.01); *F16H 2048/382* (2013.01)

(58) Field of Classification Search
CPC ...................................... F16H 48/00–2048/426
See application file for complete search history.

(56) References Cited

U.S. PATENT DOCUMENTS

| 3,872,741 A | 3/1975 | Berchtold et al. |
| 3,942,338 A | 3/1976 | Furlette et al. |
| 4,363,248 A | 12/1982 | Brisabois |
| 5,304,103 A * | 4/1994 | Schlosser ................ F16H 48/08 475/230 |
| 5,647,814 A | 7/1997 | Krisher |
| 5,806,371 A | 9/1998 | Hibbler et al. |
| 5,980,417 A | 11/1999 | Wopshall, Jr. |

(Continued)

*Primary Examiner* — David R Morris
(74) *Attorney, Agent, or Firm* — Burris Law, PLLC (57) ABSTRACT

A vehicle driveline component with a differential case, a cross-pin, a differential gearset, and a retaining member. The differential case is rotatable about a first axis and has an annular wall member that defines a differential cavity. The cross-pin is received in a cross-pin aperture formed through a first side of the annular wall member. The cross-pin extends through the differential cavity along a second axis that is perpendicular to the first axis. The differential gearset is received in the differential cavity and includes a pair of side gears, which are rotatable about the first axis, and a pair of pinion gears that are journally supported by the cross-pin and meshingly engaged with the side gears. The retaining member is welded to the annular wall member and limits movement of the cross-pin relative to the differential case along the second axis in a direction toward the retaining member.

20 Claims, 4 Drawing Sheets

(56) References Cited

U.S. PATENT DOCUMENTS

| | | | |
|---|---|---|---|
| 6,120,408 | A | 9/2000 | Yates, III et al. |
| 6,802,793 | B2 | 10/2004 | Zink et al. |
| 7,648,438 | B2 | 1/2010 | Corless |
| 7,837,588 | B2 | 11/2010 | Valente |
| 7,892,134 | B2 * | 2/2011 | Fusegi .................... F16H 48/24 475/235 |
| 7,951,037 | B2 | 5/2011 | Sudorowski et al. |
| 8,092,335 | B2 * | 1/2012 | Suzuki .................... F16H 48/08 475/230 |
| 8,113,979 | B2 | 2/2012 | Downs et al. |
| 9,249,872 | B2 | 2/2016 | Downs et al. |
| 9,423,014 | B2 | 8/2016 | Worman, Jr. |
| 2004/0162177 | A1 | 8/2004 | Zink et al. |
| 2007/0054771 | A1 | 3/2007 | Fusegi |
| 2007/0269157 | A1 | 11/2007 | Fahrni et al. |
| 2008/0194373 | A1 * | 8/2008 | Suzuki .................... F16H 48/08 475/230 |
| 2009/0019966 | A1 | 1/2009 | Valente |
| 2009/0048055 | A1 | 2/2009 | Corless |
| 2009/0305835 | A1 | 12/2009 | Sudorowski et al. |
| 2011/0152028 | A1 | 6/2011 | Downs et al. |
| 2014/0274541 | A1 | 9/2014 | Downs et al. |
| 2016/0102747 | A1 | 4/2016 | Worman, Jr. |
| 2016/0354088 | A1 | 12/2016 | Cabrera et al. |

* cited by examiner

DRIVELINE COMPONENT HAVING DIFFERENTIAL ASSEMBLY WITH RETAINING MEMBER WELDED TO DIFFERENTIAL CASE TO RETAIN CROSS-PIN

CROSS-REFERENCE TO RELATED APPLICATIONS

This is a divisional application of U.S. application Ser. No. 15/432,162 filed Feb. 14, 2017, the disclosure of which is incorporated by reference as if fully set forth in detail herein.

FIELD

The present disclosure relates to a driveline component having a differential assembly with a retaining member that is welded to a differential case to retain a cross-pin to the differential case.

BACKGROUND

This section provides background information related to the present disclosure which is not necessarily prior art.

Differential assemblies are commonly employed in various types of driveline components, such as front and rear axles, transfer cases and center differentials. One common type of differential assembly employs a differential case, a differential gearset and a cross-pin. The differential gearset is received in the differential case and has a pair of bevel side gears, which typically serve as the outputs of the differential assembly, and a pair of bevel pinion gears that are meshed with the bevel side gears. The cross-pin is mounted to the differential case and extends perpendicular to the rotational axis of the differential case. Each of the pinion gears is journally supported by the cross-pin such that the pinion gears are rotatable about the cross-pin.

Usually, a bolt is employed to limit movement of the cross-pin relative to the differential case along the longitudinal axis of the cross-pin. The bolt is typically received in a hole that is formed in the differential case. While construction in the manner is typically satisfactory, it is necessary to provide additional material in the differential case that can be machined to receive the bolt. The bolt, the additional material in the differential case and the machining of the differential case to receive the bolt increase the cost of the driveline component.

SUMMARY

This section provides a general summary of the disclosure, and is not a comprehensive disclosure of its full scope or all of its features.

In one form, the present teachings provide a vehicle driveline component that includes a differential case, a cross-pin, a differential gearset, and a retaining member. The differential case is rotatable about a first axis and has an annular wall member that defines a differential cavity. The cross-pin is received in a cross-pin aperture formed through a first side of the annular wall member. The cross-pin extends through the differential cavity along a second axis that is perpendicular to the first axis. The differential gearset is received in the differential cavity and includes a pair of side gears and a pair of pinion gears. The side gears are rotatable about the first axis. Each of the pinion gears are journally supported by the cross-pin and are meshingly engaged with both of the side gears. The retaining member is welded to the annular wall member and limits movement of the cross-pin relative to the differential case along the second axis in a direction toward the retaining member.

According to a further embodiment of the invention, the cross-pin aperture intersects a second side of the annular wall member that is opposite the first side, and wherein the cross-pin aperture does not extend fully through the second side of the annular wall member.

According to a further embodiment of the invention, the cross-pin aperture intersects a second side of the annular wall member that is opposite the first side, and wherein a portion of the cross-pin aperture that extends through the second side of the annular wall member is stepped so that a shoulder is formed in the second side of the annular wall member.

According to a further embodiment of the invention, the retaining member comprises an annular body member and a plurality of feet that extend radially outwardly from the annular body member, the feet being spaced about the circumference of the annular body member, wherein discrete welds are formed between the annular wall member and each of the feet that contact the annular wall member. Optionally, each of the feet can be generally L-shaped.

In another form, the present teachings provide a method for forming a driveline component. The method includes: providing a differential case having an annular wall member that defines a differential cavity, the differential case being rotatable about a first axis; installing a differential gearset into the differential cavity, the differential gearset having a pair of side gears and a pair of pinion gears, the side gears being rotatable about the first axis, each of the pinion gears being meshingly engaged with both of the side gears; installing a cross-pin to the differential case and the pair of pinion gears such that the cross-pin is disposed along a second axis that is perpendicular to the first axis, the cross-pin extending through a first end of a cross-pin aperture formed through a first side of the annular wall member and journally supporting the pair of pinion gears; and welding a retaining member to the annular wall member, the retaining member limiting movement of the cross-pin relative to the differential case along the second axis in a direction toward the retaining member.

According to a further embodiment of the invention, welding the retaining member to the annular wall member includes projection welding the retaining member to the annular wall member.

According to a further embodiment of the invention, the annular wall member comprises a steel insert and a cast-iron body into which the steel insert is overmolded, and wherein the retaining member is welded to the steel insert.

In still another form, the present teachings provide a vehicle driveline component that includes a differential case, a cross-pin, and a differential gearset. The differential case is rotatable about a first axis and has an annular wall member that defines a differential cavity. The cross-pin is received in a cross-pin aperture formed through a first side of the annular wall member. The cross-pin extends through the differential cavity along a second axis that is perpendicular to the first axis. The differential gearset is received in the differential cavity and includes a pair of side gears and a pair of pinion gears. The side gears are rotatable about the first axis. Each of the pinion gears are journally supported by the cross-pin and are meshingly engaged with both of the side gears. A portion of the annular wall member that is disposed about the cross-pin aperture is deformed into the cross-pin aperture to form a retaining member. The retaining member limits movement of the cross-pin relative to the differential case along the second axis in a direction toward the retaining member.

According to a further embodiment of the invention, the annular wall member is formed entirely of a single material.

In yet another form, the present teachings provide a method for forming a driveline component. The method includes: providing a differential case having an annular wall member that defines a differential cavity, the differential case being rotatable about a first axis; installing a differential gearset into the differential cavity, the differential gearset having a pair of side gears and a pair of pinion gears, the side gears being rotatable about the first axis, each of the pinion gears being meshingly engaged with both of the side gears; installing a cross-pin to the differential case and the pair of pinion gears such that the cross-pin is disposed along a second axis that is perpendicular to the first axis, the cross-pin extending through a first end of a cross-pin aperture formed through a first side of the annular wall member and journally supporting the pair of pinion gears; and deforming a portion of the annular wall member to form a retaining member that limits movement of the cross-pin relative to the differential case along the second axis in a direction toward the retaining member.

According to a further embodiment of the invention, the annular wall member is formed entirely of a single material.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
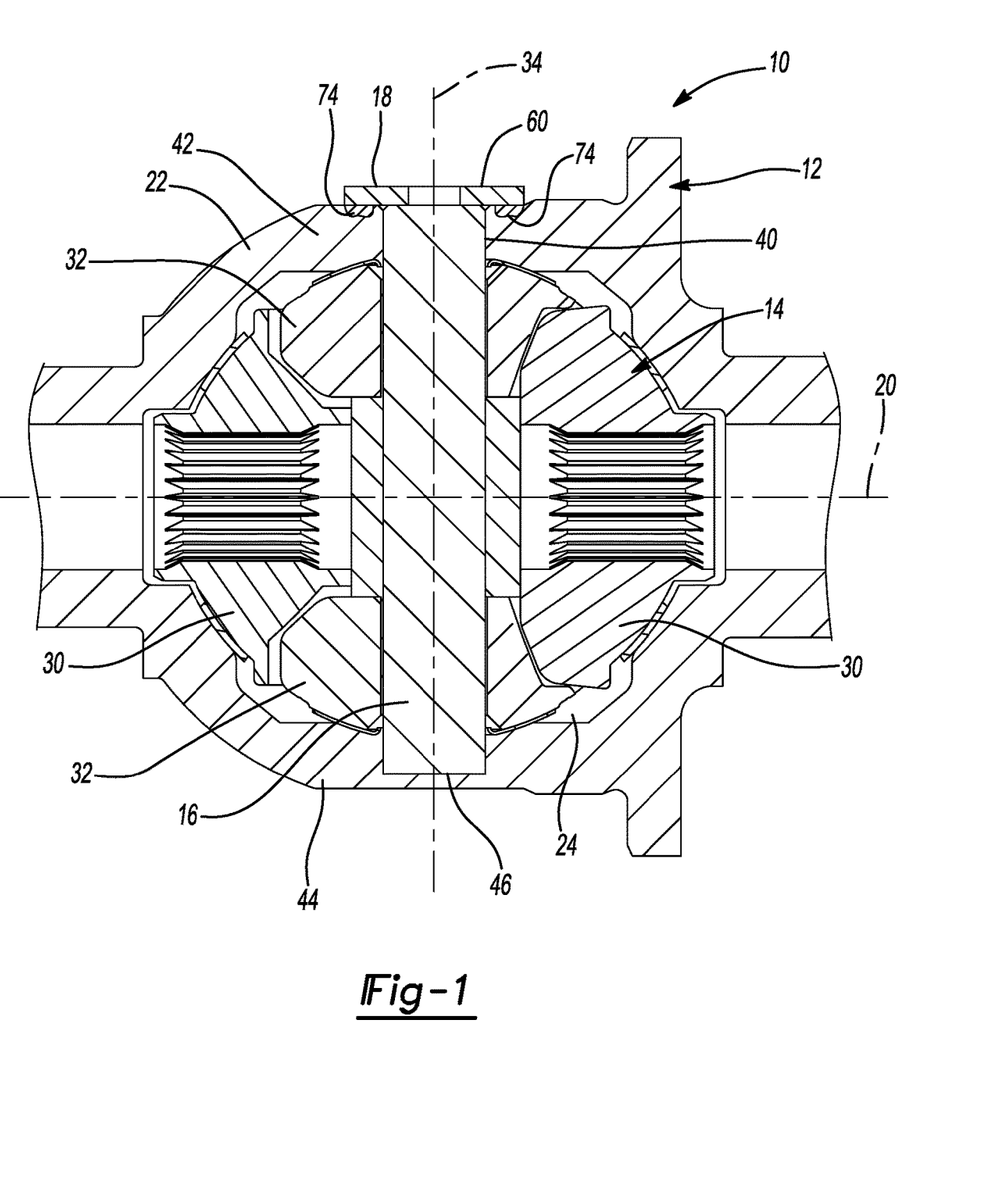
FIG. 1 is a longitudinal section view of a portion of a first driveline component constructed in accordance with the teachings of the present disclosure.

With reference to FIG. 1 of the drawings, a portion of an exemplary driveline component 10 that is constructed in accordance with the teachings of the present disclosure is shown. The driveline component 10 in the particular example provided is an axle assembly, but it will be appreciated that the teachings of the present disclosure have application to other types of driveline components including transfer cases and center differentials. The driveline component 10 includes a differential case 12, a differential gearset 14, a cross-pin 16 and at least one retaining member 18.

The differential case 12 is rotatable about a first axis 20 and can have an annular wall member 22 that can define a differential cavity 24. The annular wall member 22 can be unitarily formed of an appropriate material, such as steel, cast iron or aluminum.

The differential gearset 14 is received in the differential cavity 24 and includes a pair of side gears 30 and a pair of pinion gears 32. The side gears 30 are rotatable about the first axis 20. Each of the pinion gears 32 is meshingly engaged with both of the side gears 30.

Figure 2:
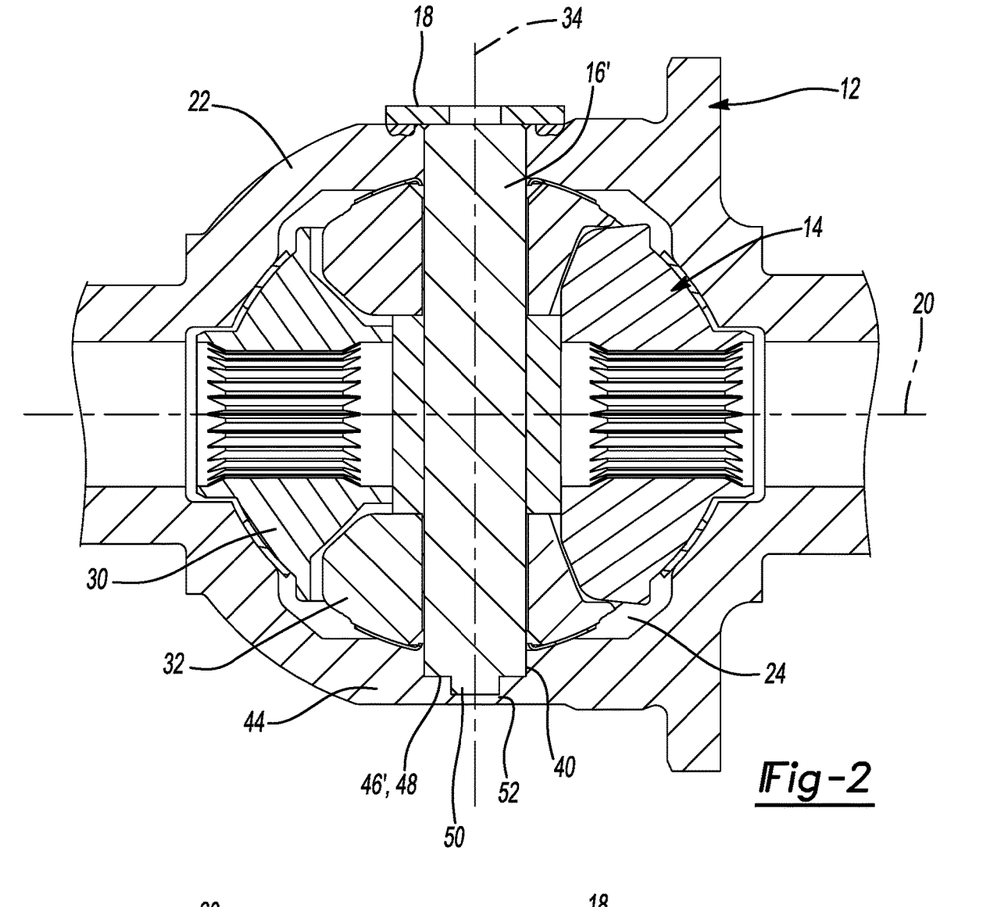
FIG. 2 is a longitudinal section view of a portion of a second driveline component constructed in accordance with the teachings of the present disclosure.

The cross-pin 16 is received in a cross-pin aperture 40 formed through a first side 42 of the annular wall member 22. The pinion gears 32 are journally supported by the cross-pin 16 for rotation about a second axis 34. Stated another way, each of the pinion gears 32 is received over the cross-pin 16 and is rotatable thereon. The cross-pin aperture 40 intersects a second side 44 of the annular wall member 22 that is opposite the first side 42, and the cross-pin 16 is received into the portion of the cross-pin aperture 40 that is formed in the second side 44 of the annular wall member 22. In the particular example provided, the portion of the cross-pin aperture 40 that intersects the second side 44 of the annular wall member 22 does not extend completely through the second side 44 of the annular wall member 22 and forms a shoulder 46 against which the cross-pin 16 is abutted. Alternatively, as shown in FIG. 2, the portion of the cross-pin aperture 40 that intersects the second side 44 of the annular wall member 22 can be stepped so as to define a shoulder 48 and the cross-pin 16' can likewise be stepped so that a shoulder 46' on the cross-pin 16' abuts the shoulder 48 in the second side 44 of the annular wall member 22 and a necked-down portion 50 of the cross-pin 16' is received in a reduced diameter portion 52 of the cross-pin aperture 40.

Returning to FIG. 1, the retaining member 18 is welded to the annular wall member 22 and limits movement of the cross-pin 16 relative to the differential case 12 along the second axis 34 in a direction toward the retaining member 18. Any appropriate welding process, such as projection welding, resistance welding, laser welding, etc., can be employed to secure the retaining member 18 to the annular wall member 22. In situations where the cross-pin aperture 40 is sized on both of the first and second sides 42 and 44 to receive the cross-pin 16 therethrough, two retaining members 18 could be employed to secure the cross-pin 16 to the differential case 12 (i.e., a first retaining member 18 welded to the first side 42 of the annular wall member 22 and a second retaining member 18 welded to the second side 44 of the annular wall member 22).

Figure 3:
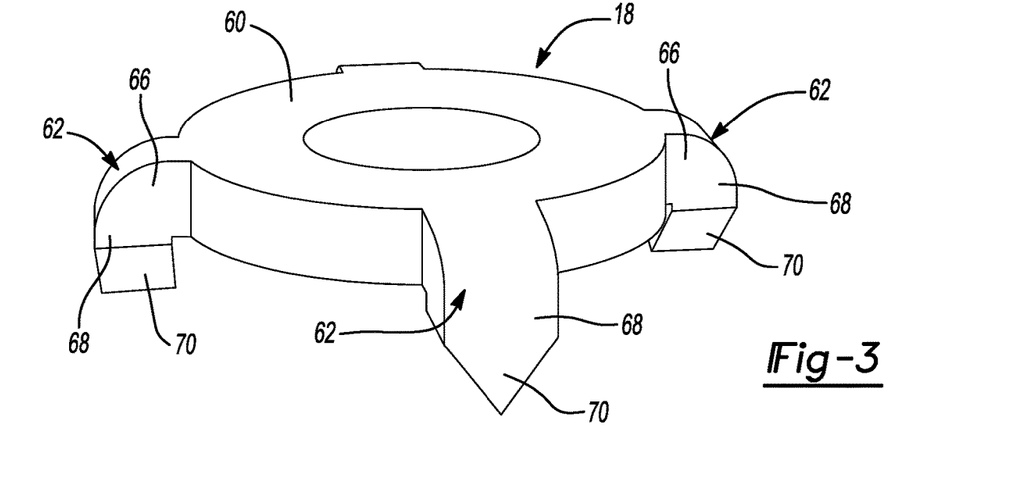
FIG. 3 is a perspective view of a portion of the first driveline component of FIG. 1, illustrating a retaining member in more detail.
Figure 4:
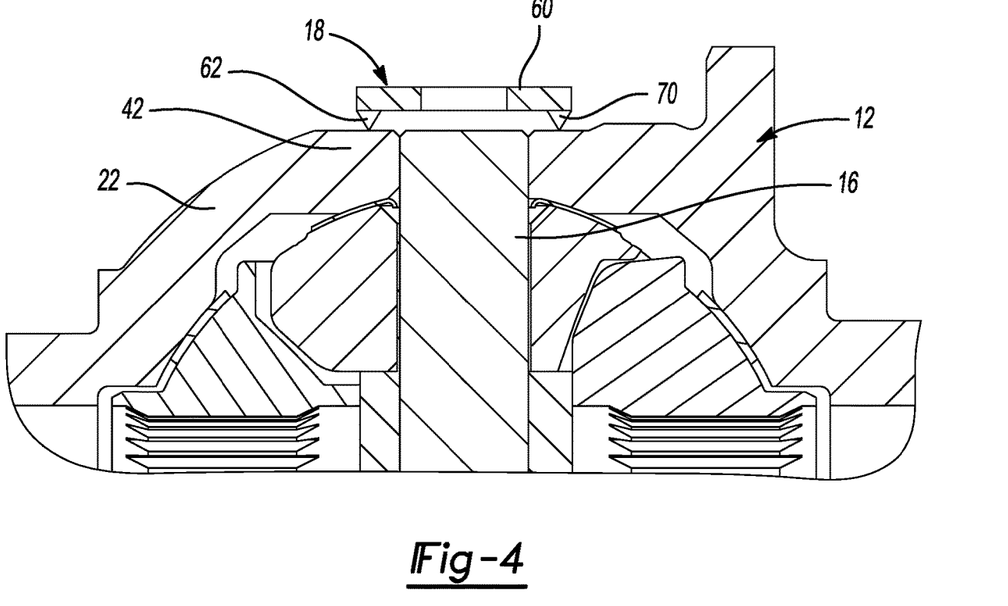
FIG. 4 is a portion of a view similar to that of FIG. 1 but illustrating the retaining member abutted to an annular wall member of a differential case prior to a projection welding operation that secures the retaining member to the annular wall member.

With reference to FIGS. 1, 3 and 4, the retaining member 18 can include an annular body member 60 and a plurality of feet 62. The feet 62 can be spaced about the circumference of the annular body member 60 and can extend radially outwardly from the annular body member 60. In the particular example provided, each of the feet 62 is generally L-shaped, with a first portion 66, which extends radially from the annular body member 60, and a second portion 68 that is coupled to the distal end of the first portion 66 and which extends in an axial direction that is perpendicular to the first portion 66. The second portion 68 of the feet 62 can terminate at a distal end 70 that can be formed to facilitate the welding of the retaining member 18 to the annular wall member 22. In the example provided, the distal ends 70 of the second portion 68 of the feet 62 are formed as generally V-shaped teeth that reduce the area of contact between the retaining member 18 and the annular wall member 22. It will be appreciated from this disclosure that a plurality of discrete welds 74 are formed between the annular wall member 22 and each of the feet 62 that contact the annular wall member 22.

Figure 5:
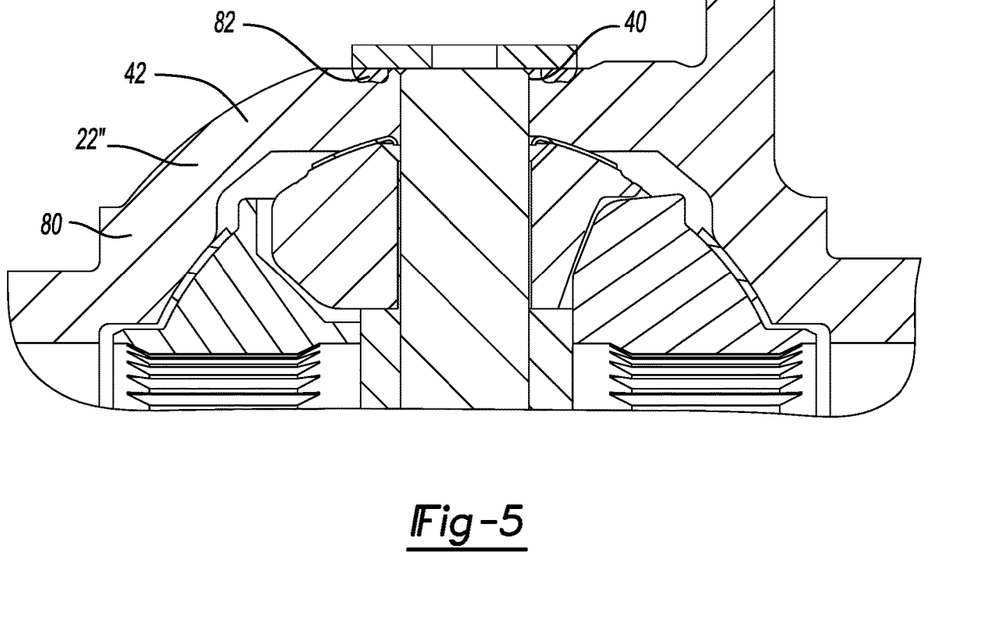
FIG. 5 is a longitudinal section view of a portion of a third driveline component constructed in accordance with the teachings of the present disclosure.

While the annular wall member 22 has been illustrated and described as being formed from a single material, such as steel, cast iron or aluminum, it will be appreciated that the annular wall member 22 could be constructed somewhat differently. With reference to FIG. 5 for example, the annular wall member 22" can comprise a body member 80 and an insert 82 that is fixedly coupled to the body member 80 and at least partly defines the cross-pin aperture 40 in the first side 42 of the annular wall member 22. The body member 80 can be formed from a first material that can be difficult to weld, such as cast iron. The insert 82 can be formed from a second, different material that is somewhat easier to weld than the first material, such as steel. The body member 80 can be overmolded onto the insert 82 so that the insert 82 is partly encapsulated in the first material that forms the body member 80.

While the retaining member 18 has been described herein and illustrated as comprising a plurality of feet 62 that extend radially outboard of a body member 80, it will be appreciated that the retaining member 18 could be configured differently without altering the function of the retaining member 18. For example, one continuous foot or rib (not shown) could be substituted for the feet 62. The single foot/rib could be disposed concentrically about the cross-pin aperture 40 radially inward of the radially outward edge of the body member 80. The single foot/rib could be profiled in a desired manner to limit contact between the retaining member 18 and the annular wall member 22 prior to the initiation of the projection/resistance welding operation and/or to aid in controlling the projection/resistance welding operation once initiated, and/or to shape and/or size a heat affected zone on the annular wall 22, and/or to control the depth and/or size of the projection/resistance weld. For example, the single foot/rib can be formed such that it has a distal end (which would contact the annular wall member 22 prior to the initiation of the welding operation) along a line that is contoured to match the cylindrical surface of the annular wall member 22. The distal end can be pointed (i.e., V-shaped in lateral cross-section) or could be rounded (e.g., U-shaped or defined by a spherical radius in lateral cross-section), for example.

Figure 6:
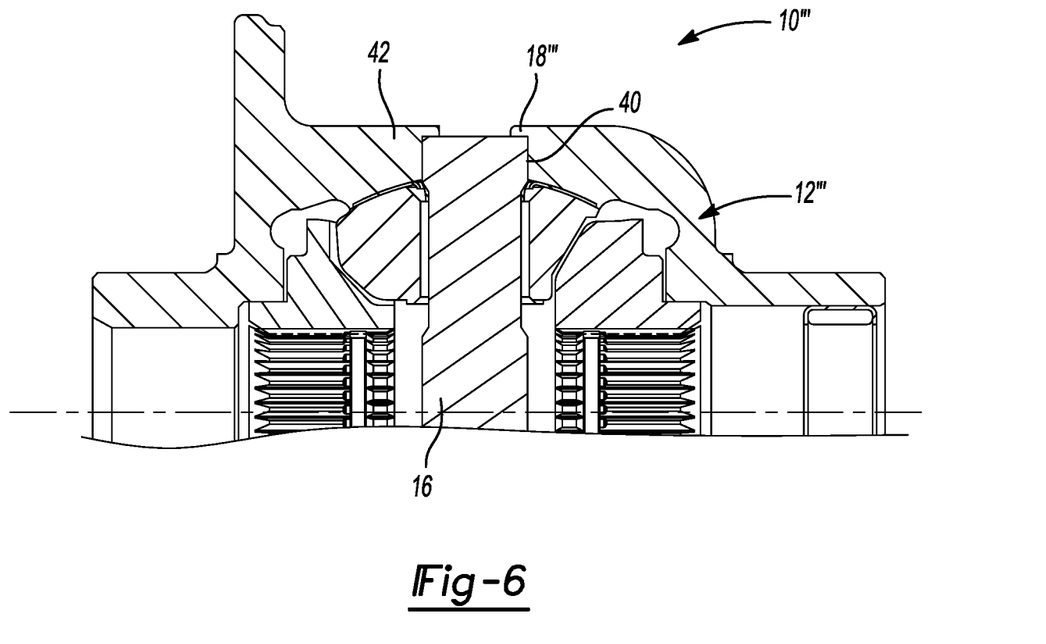
FIG. 6 is a longitudinal section view of a portion of a fourth driveline component constructed in accordance with the teachings of the present disclosure.
Figure 7:
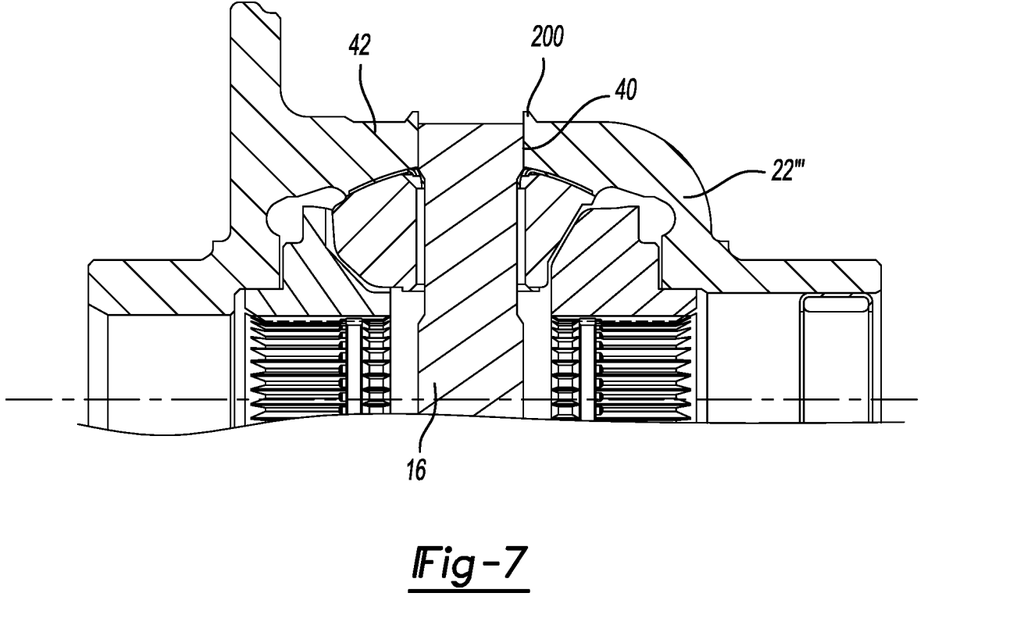
FIG. 7 is a view similar to that of FIG. 6 but illustrating a differential case prior to the formation of a crimp that is configured to retain a cross-pin in the differential case.

With reference to FIG. 6, a portion of another driveline component 10''' constructed in accordance with the teachings of the present disclosure is illustrated. In this example, the retaining member 18''' is integrally formed with the differential case 12'''. With reference to FIG. 7, a portion of the annular wall member 22''' proximate the cross-pin aperture 40 is formed with excess material 200 that extends radially outwardly from the first side 42 of the annular wall member 22'''. The excess material 200 can be disposed about the circumference of the cross-pin aperture 40 in a desired manner, such as in a continuous and unbroken manner, or as a series of projections. The excess material 200 is deformed after the cross-pin 16 is inserted into the cross-pin aperture 40 as shown in FIG. 6 to thereby form the retaining member 18''', which fixedly secures the cross-pin 16 to the differential case 12'''. In the particular example shown, the annular wall member 22''' is unitarily formed from a single material, but it will be appreciated that an insert (not shown) having the excess material 200 could be cast/overmolded into the material that forms the remainder of the annular wall member 22''' similar to the configuration that is depicted in FIG. 5.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A vehicle driveline component comprising:
a differential case that is rotatable about a first axis, the differential case having a wall member that defines a differential cavity and a cross-pin aperture, the cross-pin aperture extending through interior and exterior surfaces of the wall member along a second axis that is perpendicular to the first axis;
a cross-pin received in the cross-pin aperture, the cross-pin having an axial end that is disposed between the interior and exterior surfaces of the wall member;
a differential gearset received in the differential cavity, the differential gearset comprising a pair of side gears and a pair of differential pinion gears, the side gears being rotatable about the first axis, each of the differential pinion gears being journally supported by the cross-pin and meshingly engaged with both of the side gears; and
a retaining member abutted to the exterior surface of the wall member and welded to the wall member to limit movement of the cross-pin relative to the differential case along the second axis in a direction toward the retaining member;
wherein the retaining member does not extend circumferentially about the differential case.

2. A vehicle driveline component comprising:
a differential case that is rotatable about a first axis, the differential case having a wall member that defines a differential cavity and a cross-pin aperture, the cross-pin aperture extending through interior and exterior surfaces of the wall member along a second axis that is perpendicular to the first axis;
a cross-pin received in the cross-pin aperture, the cross-pin having an axial end that is disposed between the interior and exterior surfaces of the wall member;
a differential gearset received in the differential cavity, the differential gearset comprising a pair of side gears and a pair of differential pinion gears, the side gears being rotatable about the first axis, each of the differential pinion gears being journally supported by the cross-pin and meshingly engaged with both of the side gears; and
a retaining member abutted to the exterior surface of the wall member and welded to the wall member to limit movement of the cross-pin relative to the differential case along the second axis in a direction toward the retaining member;
wherein the cross-pin aperture intersects a side of the wall member that is opposite a side of the wall member to which the retaining member is welded and wherein the cross-pin aperture does not extend fully through the side of the wall member that is opposite the side of the wall member to which the retaining member is welded.

3. The vehicle driveline component of claim 2, wherein the retaining member is resistance welded to the wall member.

4. The vehicle driveline component of claim 3, wherein the retaining member is projection welded to the wall member.

5. A vehicle driveline component comprising:
a differential case that is rotatable about a first axis, the differential case having a wall member that defines a differential cavity and a cross-pin aperture, the cross-pin aperture extending through interior and exterior surfaces of the wall member along a second axis that is perpendicular to the first axis;
a cross-pin received in the cross-pin aperture, the cross-pin having an axial end that is disposed between the interior and exterior surfaces of the wall member;
a differential gearset received in the differential cavity, the differential gearset comprising a pair of side gears and a pair of differential pinion gears, the side gears being rotatable about the first axis, each of the differential pinion gears being journally supported by the cross-pin and meshingly engaged with both of the side gears; and
a retaining member abutted to the exterior surface of the wall member and welded to the wall member to limit movement of the cross-pin relative to the differential case along the second axis in a direction toward the retaining member;
wherein an end of the cross-pin aperture that is opposite a side of the wall member to which the retaining member is welded is stepped to form a shoulder against which the cross-pin is abutted.

6. The vehicle driveline component of claim 5, wherein the retaining member is resistance welded to the wall member.

7. The vehicle driveline component of claim 6, wherein the retaining member is projection welded to the wall member.

8. A vehicle driveline component comprising:
a differential case that is rotatable about a first axis, the differential case having a wall member that defines a differential cavity and a cross-pin aperture, the cross-pin aperture extending through interior and exterior surfaces of the wall member along a second axis that is perpendicular to the first axis;
a cross-pin received in the cross-pin aperture, the cross-pin having an axial end that is disposed between the interior and exterior surfaces of the wall member;
a differential gearset received in the differential cavity, the differential gearset comprising a pair of side gears and a pair of differential pinion gears, the side gears being rotatable about the first axis, each of the differential pinion gears being journally supported by the cross-pin and meshingly engaged with both of the side gears; and
a retaining member abutted to the exterior surface of the wall member and welded to the wall member to limit movement of the cross-pin relative to the differential case along the second axis in a direction toward the retaining member;
wherein the wall member comprises a steel insert and a cast-iron body into which the steel insert is coupled, and wherein the retaining member is welded to the steel insert.

9. The vehicle driveline component of claim 8, wherein the wall member is overmolded onto the steel insert.

10. The vehicle driveline component of claim 8, wherein the retaining member is resistance welded to the wall member.

11. A vehicle driveline component comprising:
a differential case that is rotatable about a first axis, the differential case having a wall member that defines a differential cavity and a cross-pin aperture, the cross-pin aperture extending through interior and exterior surfaces of the wall member along a second axis that is perpendicular to the first axis;
a cross-pin received in the cross-pin aperture, the cross-pin having an axial end that is disposed between the interior and exterior surfaces of the wall member;
a differential gearset received in the differential cavity, the differential gearset comprising a pair of side gears and a pair of differential pinion gears, the side gears being rotatable about the first axis, each of the differential pinion gears being journally supported by the cross-pin and meshingly engaged with both of the side gears; and
a retaining member abutted to the exterior surface of the wall member and welded to the wall member to limit movement of the cross-pin relative to the differential case along the second axis in a direction toward the retaining member;
wherein the retaining member comprises an annular body member and a plurality of feet that extend radially outwardly from the annular body member, the feet being spaced about the circumference of the annular body member, wherein discrete welds are formed between the annular wall member and each of the feet that contact the exterior surface of the wall member.

12. The vehicle driveline component of claim 11, wherein each of the feet is generally L-shaped.

13. The vehicle driveline component of claim 11, wherein the retaining member is resistance welded to the wall member.

14. The vehicle driveline component of claim 13, wherein the retaining member is projection welded to the wall member.

15. A method for forming a driveline component, the method comprising:
providing a differential case having an annular wall member that defines a differential cavity, the differential case being rotatable about a first axis;
installing a differential gearset into the differential cavity, the differential gearset having a pair of side gears and a pair of pinion gears, the side gears being rotatable about the first axis, each of the pinion gears being meshingly engaged with both of the side gears;
installing a cross-pin to the differential case and the pair of pinion gears such that the cross-pin is disposed along a second axis that is perpendicular to the first axis, the cross-pin extending through a first end of a cross-pin aperture formed through a first side of the annular wall member and journally supporting the pair of pinion gears; and
welding a retaining member to the annular wall member, the retaining member limiting movement of the cross-pin relative to the differential case along the second axis in a direction toward the retaining member, wherein the retaining member does not extend circumferentially about the differential case.

16. The method of claim 15, wherein welding the retaining member to the annular wall member comprises projection welding the retaining member to the annular wall member.

17. A method for forming a driveline component, the method comprising:
- providing a differential case having an annular wall member that defines a differential cavity, the differential case being rotatable about a first axis;
- installing a differential gearset into the differential cavity, the differential gearset having a pair of side gears and a pair of pinion gears, the side gears being rotatable about the first axis, each of the pinion gears being meshingly engaged with both of the side gears;
- installing a cross-pin to the differential case and the pair of pinion gears such that the cross-pin is disposed along a second axis that is perpendicular to the first axis, the cross-pin extending through a first end of a cross-pin aperture formed through a first side of the annular wall member and journally supporting the pair of pinion gears; and
- upsetting a portion of the annular wall member after the cross-pin has been installed to the differential case and the pinion gears to form a retaining member that limits movement of the cross-pin relative to the differential case along the second axis in a direction toward the retaining member.

18. The method of claim 17, wherein the annular wall member is formed entirely of a single material.

19. A vehicle driveline component comprising:
- a differential case having an annular wall member that defines a differential cavity, the differential case being rotatable about a first axis;
- a cross-pin received in a cross-pin aperture formed through a first side of the annular wall member, the cross-pin extending through the differential cavity along a second axis that is perpendicular to the first axis; and
- a differential gearset received in the differential cavity, the differential gearset comprising a pair of side gears and a pair of pinion gears, the side gears being rotatable about the first axis, each of the pinion gears being journally supported by the cross-pin and meshingly engaged with both of the side gears;
- wherein a portion of the annular wall member is upset against an axial end of the cross-pin.

20. The vehicle driveline component of claim 19, wherein the annular wall member is formed entirely of a single material.

* * * * *

UNITED STATES PATENT AND TRADEMARK OFFICE
CERTIFICATE OF CORRECTION

PATENT NO. : 11,047,465 B2  
APPLICATION NO. : 16/432068  
DATED : June 29, 2021  
INVENTOR(S) : Robert C. Gorski et al.

Page 1 of 1

It is certified that error appears in the above-identified patent and that said Letters Patent is hereby corrected as shown below:

In the Claims

In Column 9, Line 18 before "upsetting", insert --plastically-- therefor.

Signed and Sealed this  
Third Day of August, 2021

Drew Hirshfeld  
*Performing the Functions and Duties of the*  
*Under Secretary of Commerce for Intellectual Property and*  
*Director of the United States Patent and Trademark Office*